US009799072B2

(12) United States Patent
Haller et al.

(10) Patent No.: US 9,799,072 B2
(45) Date of Patent: Oct. 24, 2017

(54) ENHANCED QUOTE AND ORDER INTEGRATION SYSTEM AND METHOD

(75) Inventors: Thomas Haller, Longwood, FL (US); Mario Jimenez, Orlando, FL (US)

(73) Assignee: NYSE Group, Inc., New York, NY (US)

( * ) Notice: Subject to any disclaimer, the term of this patent is extended or adjusted under 35 U.S.C. 154(b) by 1438 days.

(21) Appl. No.: 11/880,686

(22) Filed: Jul. 24, 2007

(65) Prior Publication Data

US 2009/0030828 A1 Jan. 29, 2009

Related U.S. Application Data

(60) Provisional application No. 60/834,327, filed on Jul. 28, 2006.

(51) Int. Cl.
| | |
|---|---|
| *G06Q 40/04* | (2012.01) |
| *G06Q 30/06* | (2012.01) |
| *G06Q 40/00* | (2012.01) |
| *G06Q 40/06* | (2012.01) |

(52) U.S. Cl.
CPC ............ *G06Q 40/04* (2013.01); *G06Q 30/06* (2013.01); *G06Q 40/00* (2013.01); *G06Q 40/06* (2013.01)

(58) Field of Classification Search
CPC .............................. G06Q 40/04; G06Q 40/06
USPC ............................................................ 705/37
See application file for complete search history.

(56) References Cited

U.S. PATENT DOCUMENTS

| | | | | |
|---|---|---|---|---|
| 6,278,982 B1 * | 8/2001 | Korhammer et al. | ...... | 705/36 R |
| 6,618,707 B1 * | 9/2003 | Gary | ............ | 705/36 R |
| 7,197,483 B2 | 3/2007 | Brady et al. | | |
| 7,246,093 B1 * | 7/2007 | Katz | ...................... | G06Q 40/00 705/35 |
| 7,356,498 B2 | 4/2008 | Kaminsky et al. | | |
| 7,835,987 B2 * | 11/2010 | Daley et al. | ..................... | 705/40 |
| 2002/0091624 A1 * | 7/2002 | Glodjo | .................. | G06Q 20/10 705/37 |
| 2002/0128955 A1 | 9/2002 | Brady et al. | | |
| 2003/0004858 A1 | 1/2003 | Schmitz et al. | | |
| 2003/0009412 A1 | 1/2003 | Furbush et al. | | |
| 2003/0009413 A1 | 1/2003 | Furbush et al. | | |
| 2003/0083974 A1 * | 5/2003 | Bunda | ............. | 705/37 |
| 2003/0097328 A1 | 5/2003 | Lundberg et al. | | |
| 2003/0130926 A1 * | 7/2003 | Moore et al. | .................. | 705/37 |
| 2003/0229557 A1 * | 12/2003 | Richmann et al. | ............ | 705/36 |
| 2004/0030630 A1 * | 2/2004 | Tilfors | ................ | G06Q 20/201 705/37 |
| 2004/0143538 A1 * | 7/2004 | Korhammer et al. | .......... | 705/37 |
| 2004/0254804 A1 * | 12/2004 | Peterffy et al. | .................. | 705/1 |
| 2005/0119964 A1 | 6/2005 | Brady et al. | | |

(Continued)

OTHER PUBLICATIONS

International Search Report PCT/US07/16682, Jun. 17, 2008.

(Continued)

*Primary Examiner* — Bruce I Ebersman
*Assistant Examiner* — Kevin Poe
(74) *Attorney, Agent, or Firm* — DLA Piper LLP (US)

(57) ABSTRACT

An enhanced system and method for executing options trades are disclosed. The order book and quote book are maintained separately to make quote and order processing more efficient, but the order book and quote book are integrated, as needed, to determine the marketability of incoming quotes and, where necessary, so that incoming quotes can execute against resting quotes or orders.

24 Claims, 7 Drawing Sheets

(56) References Cited

U.S. PATENT DOCUMENTS

| | | | |
|---|---|---|---|
| 2005/0131802 A1* | 6/2005 | Glodjo | G06Q 30/08 705/37 |
| 2005/0246263 A1* | 11/2005 | Ogg et al. | 705/37 |
| 2006/0015441 A1* | 1/2006 | Burkhardt et al. | 705/37 |
| 2006/0206407 A1 | 9/2006 | Troxel et al. | |
| 2006/0253374 A1* | 11/2006 | Addock | G06Q 40/00 705/37 |
| 2006/0253379 A1 | 11/2006 | Adcock et al. | |
| 2007/0022041 A1 | 1/2007 | Durkin et al. | |
| 2007/0043647 A1 | 2/2007 | Bickford | |
| 2007/0078753 A1 | 4/2007 | Cormack et al. | |
| 2010/0023444 A1* | 1/2010 | Burkhardt et al. | 705/37 |

OTHER PUBLICATIONS

A Taxonomy of Automated Trade Execution Systems, Ian Domowitz, Journal of International Money and Finance, (1993), 12, pp. 607-631.

* cited by examiner

ENHANCED QUOTE AND ORDER INTEGRATION SYSTEM AND METHOD

CROSS-REFERENCE TO RELATED APPLICATIONS

This application claims priority from and claims the benefit of U.S. Provisional Application No. 60/834,327, filed Jul. 28, 2006, entitled "Electronic Equity Options Order Execution and Routing System," which is hereby incorporated by reference.

BACKGROUND

In the past, when all options trades were transacted on the floor, order processing and quote processing were completely separate manual processes. Individual quotes were manually maintained in an automated system which displayed one quotation for the entire pit, representing the best price but without an associated size. Orders, on the other hand, were maintained on one or more separate order books. A best bid and offer was calculated for quotations and professional orders, while a separate best bid and offer was calculated for the limit order book.

With the widespread adoption of multiple listings, exchanges began to increasingly integrate their systems and to execute orders and quotes completely electronically. As a result, some market centers now consolidate all active nonmarketable orders and nonmarketable quotes and maintain them together in the same book memory. For electronic systems that algorithmically allocate trades among orders and quotes, there are advantages to storing both in the same book.

In addition to storing orders and quotes in the same book, some systems also allow orders and quotes to be submitted to a market center using the same data pipeline, requiring a "thicker" telecom link to handle both, as an order message generally requires more data elements than a quote message does. While the ability to use one pipeline for both orders and quotes has some operational advantages, and having both orders and quotes already integrated on a single book makes it easier to execute and allocate trades, such business strategies may be less than optimal from a performance standpoint due to the high volume of options quotations compared to the much lower volume of options orders.

The options marketplace has historically been a quote-driven market, in contrast to the equities marketplace, which is generally perceived to be more of an order-driven market. On the options marketplace, a single stock can be the underlying for a hundred or more different strike prices and expiration dates. When the underlying stock is very active, market makers may need to update their quotations in dozens of options series simultaneously in response to the fluctuations of the underlying stock price.

The popularity of options trading has increased dramatically over the past few years. As a result, the quote traffic has required ever-increasing bandwidth. In recent years, the quotation rates have become so excessive that the SEC has requested that the options market centers propose quote mitigation strategies to reduce quote traffic. This issue is only being exacerbated further with the roll out of penny pricing in options. While penny increments can tighten the spread, especially in the most actively traded products, the downside is that quotes move around more in a penny environment, due to more pricing levels.

Accordingly, there is a need for a system and method that minimizes the impact of market maker quote traffic on the other components of the system, especially in regard to the ability to display and execute orders and quotes with maximum speed and efficiency.

SUMMARY

According to one aspect of the present invention, a method for enhancing quote and order integration includes providing a market center which lists a plurality of options series, wherein the market center has an order book for each option series and a quote book for each option series, wherein the order book for a series is separate from the quote book for a series. The method further includes receiving a quote for a specified option series on the market center, analyzing the received quote to determine if the quote is marketable and, wherein if the quote is marketable, generating a system alert. Further, according to this aspect, wherein, in response to the system alert, the method retrieves the order book and the quote book for the specified option series, and simultaneously, reviews the retrieved order book and quote book to determine if at least one quote or order on the retrieved quote or order book can execute against the received quote. If a retrieved order can execute against the received quote, the method generates a pseudo-order to represent the received quote and executes the generated pseudo-order against the retrieved marketable order. According to another aspect of the present invention, if a retrieved quote can execute against the received quote, the method generates a pseudo-order to represent the received quote and generates a pseudo-order to represent the retrieved quote and executes the generated pseudo-orders against each other.

DESCRIPTION OF THE DRAWINGS

These and other features, aspects and advantages of the present invention will become better understood with regard to the following description, appended claims and accompanying drawings where:

DETAILED DESCRIPTION

Figure 1:
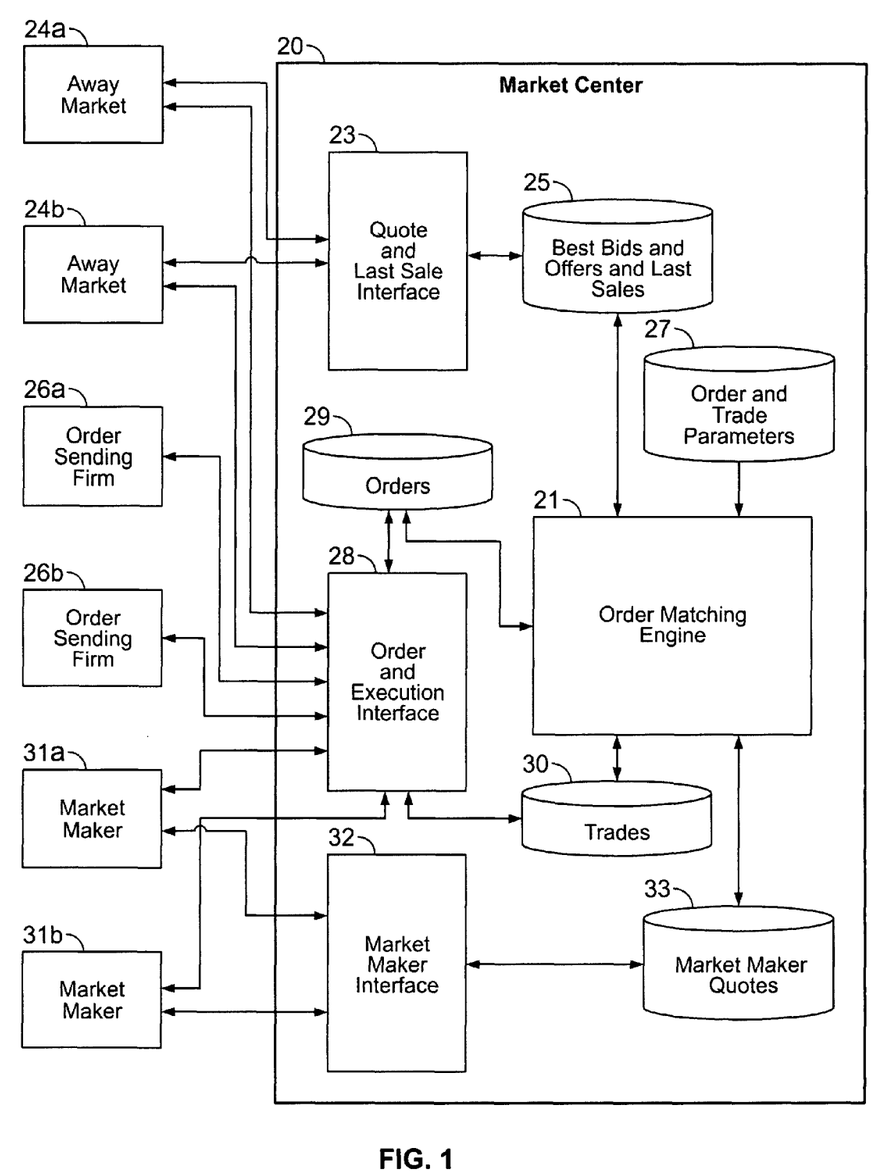
FIG. 1 is a block diagram illustrating the trading environment in which an embodiment of the present invention operates.

Referring to FIG. 1, a trading environment in which an embodiment of the system and method of the present invention operates is depicted. The examples discussed herein describe the use and application of the present invention in an equity options market center environment, but it should be understood that the present invention could be used in any type of financial instrument market center environment (e.g., equities, futures, bonds, etc.). This embodiment of the invention describes the use of multiply listed single-leg equity options in the invention environment, wherein contracts for a specified underlying security can be bought (if the option type is a call) or sold (if the option type is a put) at a specific strike price prior to a specific exercise date. The functionality described herein is generally applicable to all standard options products (including near-term options and LEAPs) in all underlying securities, including but not limited to exchange-listed stocks, Exchange-Traded Funds (ETFs), Holding Company Depositary Receipts (HOLDRs), American Depositary Receipts (ADRs), and commonly traded indices.

The trading environment of this embodiment includes a market center 20 which interacts with a number of other market centers 24 (i.e., away markets) and traders at order sending firms 26 and market makers 31. The trading environment of this invention supports a market maker interface 32 and market maker quotes data structure 33. It should also be understood that the market center 20 referred to herein refers to a computing system having sufficient processing and memory capabilities and does not refer to a specific physical location. In fact, in certain embodiments, the computing system may be distributed over several physical locations. It should also be understood that any number of traders 26 or market makers 31 or away market centers 24 can interact with the market center 20. The market center 20 is the market center on which a specific trader 26 posts a specific order, and on which a specific market maker 31 posts a specific quote. The market center 20 includes an order matching engine 21, which validates, maintains, ranks, executes and/or routes all orders on the market center 20, and which executes marketable quotes on the market center 20. In this embodiment, the code for the order matching engine 21 is stored in the market center's memory.

The market center 20 may also include a quote and last sale interface 23 that interacts with the away market centers 24 to capture quote and last sale information. This information is stored to a best bids and offers and last sales data structure 25. This data structure 25 is where the market best bid and offer information is stored. This data structure 25 is also where the market trade reports (prints) are stored. Some issues may be traded exclusively on the market center 20, and accordingly away market quotes may not exist. The market center 20 may also include an order and trade parameters data structure 27. The order and trade parameters data structure 27 stores pre-defined trading parameters and rules that are used by the order matching engine 21 in matching orders and executing trades. The market center 20 may also include an order and execution interface 28 which interacts with the traders 26, the market makers 31, the away market centers 24 and the order matching engine 21 in the order execution process.

The market center 20 may also include an order information data structure 29 where order information is stored and a trade information data structure 30 where completed trade information is stored. The market center 20 may also include a market maker interface 32 that interacts with market makers 31 to capture market maker bids and offers in assigned issues. These bids and offers are logically and physically depicted in a market maker quotes structure 33 in this illustration.

Throughout the discussion herein, it should be understood that the details regarding the operating environment, data structures, and other technological elements surrounding the market center 20 are by way of example and that the present invention may be implemented in various differing forms. For example, the data structures referred to herein may be implemented using any appropriate structure, data storage, or retrieval methodology (e.g., local or remote data storage in data bases, tables, internal arrays, etc.). Furthermore, a market center of the type described herein may support any type of suitable interface on any suitable computer system.

Figure 2:
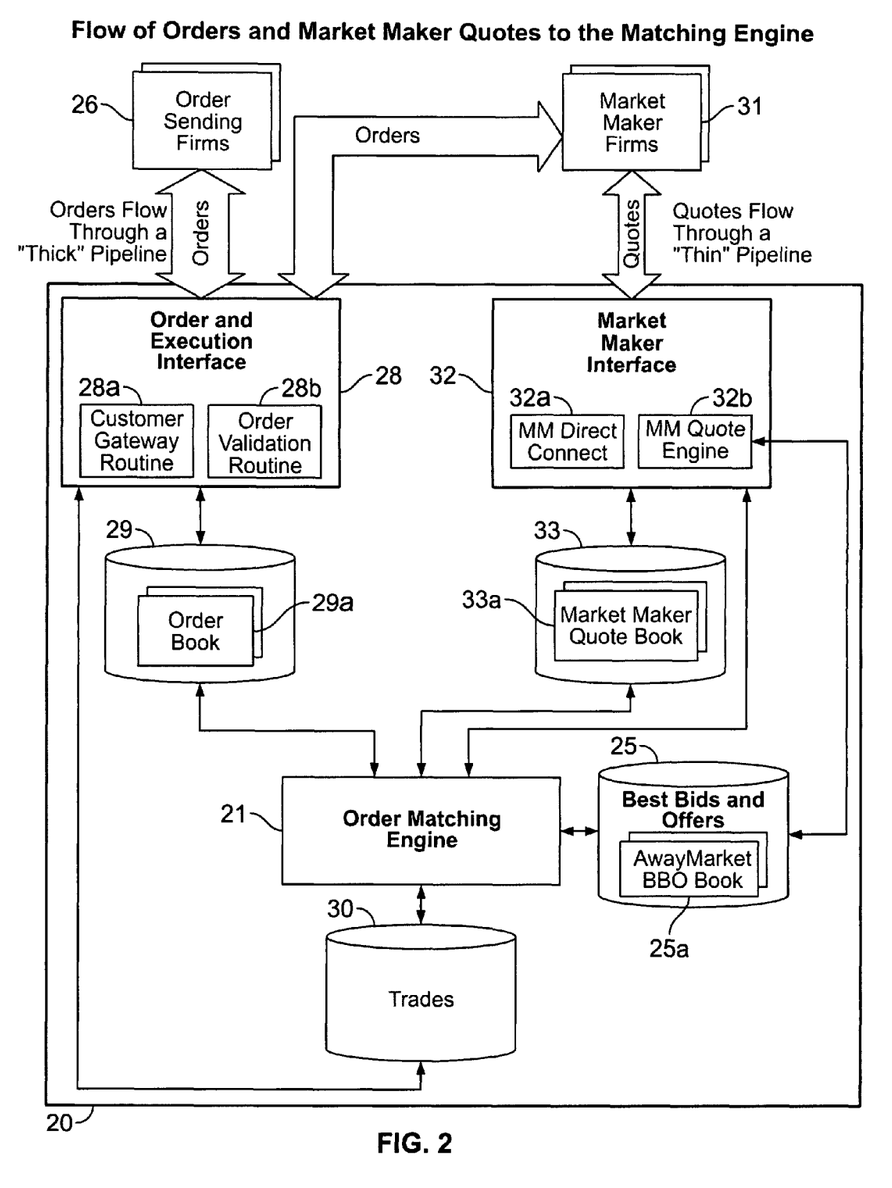
FIG. 2 is a block diagram illustrating an overview of the architecture involved in the enhanced quote and order integration process.

Referring to FIG. 2, a trading environment in which order sending firms 26 and market makers 31 send orders and quotes is depicted. As shown in FIG. 2, in this embodiment, order sending firms 26 send only orders, while market maker firms 31 send both orders and quotes. Orders sent by order sending firms 26 are transmitted to the order and execution interface 28 using what is referred to herein as a "thick" pipeline that is able to accommodate all the data that must generally be specified on an incoming order using one or more established third-party message protocols, such as FIX, which generally requires a significant amount of housekeeping information to be included in its order messages. The order and execution interface 28 includes a customer gateway routine 28a, which, when executed, invokes a process that determines whether and by what means a specific order sending firm 26 is eligible to send orders to the market center 20, and also includes an order validation routine 28b which, when executed, invokes a process that determines whether the specific order meets all the business requirements of the market center 20. If an order is determined to be valid, then the order and execution interface 28 releases the order to the order matching engine 21 for further processing. Marketable orders are executed immediately, whereas nonmarketable orders that can execute later are posted to an order book 29a on the order data structure 29. The order book 29a includes all active nonmarketable orders resident on the market center 20, including fully displayed orders, partially displayed orders and nondisplayed orders.

As illustrated in FIG. 2, orders sent by market makers 31 use a pipeline that is referred to herein as a somewhat "thinner" pipeline than the one used by order sending firms 26. Market marker orders can be sent on this somewhat thinner pipeline because orders sent by market maker firms 31 are transmitted using a direct connection, so some information such as the identity of the sender is available directly from the TCP/IP connection. If a market maker order is determined to be valid, as with an order sending firm order, then the order and execution interface 28 releases the order to the order matching engine 21 for further processing. Marketable orders are executed immediately, whereas nonmarketable orders from market makers 31 are posted to the same order book 29a as are orders from order sending firms 26.

In contrast to orders, in this embodiment, market maker quotes are transmitted to the market maker interface 32 using what is referred to herein as a very "thin" pipeline. This is possible due to the fact that, generally speaking, a quote transmitted via a validated direct TCP/IP connection is extremely lean and does not require as much overhead as an order sent using a third-party message protocol. With a TCP/IP connection, the market center 20 already knows the identity of the firm sending the quote and the message type being transmitted. With one TCP/IP Write message, a market maker can send quotes in up to 200 different series, and with one TCP/IP Read message, the market center 20 can unload the quotes into a large array in the market maker quotes data structure 33. Also, as market makers are only allowed to send one bid and one offer per option series according to the business rules of the market center 20 in this embodiment, there is no need to transmit information for the purpose of distinguishing between multiple quotes for any given market maker in a given option series. As each incoming quote automatically overwrites a prior quote, there is no need for the identification required by a cancel/replace message, reducing quote traffic and functional complexity. It should also be noted that in this embodiment, auto-quoting is not supported. All market maker quotes are generated by the market makers, and all depleted quotes are replenished by the market makers.

The market maker interface 32 includes a market maker direct connect routine 32a, and also includes a market maker quote engine 32b, which, when executed, initiates a process that receives and analyzes market maker quotes. Specifically, when the process receives a new market maker quote, it stores the quote in a market maker quote book 33a. It also checks the price of the new market maker quote against resting contra-side market maker quotes, resting contra-side market center orders and optionally the contra-side away market center quotes. If the process determines that the new market maker quote may be marketable, i.e., the new market maker quote touches (i.e., equals or overlaps with) the price of any prior order or market maker quote, then the process generates a "wake up" alert message and sends it to the order matching engine 21, identifying the potentially marketable series. The order matching engine 21, in response, as discussed in detail below, retrieves and combines the quote and order books as a virtual list 42 and reads the combined books simultaneously, i.e. "walks" the list, to determine matching opportunities.

Orders and quotes in this embodiment of the invention are transmitted using separate pipelines, are stored and maintained in separate data structures and are kept separate until they need to be commingled and integrated for analysis and potential execution purposes. This results in optimized throughput because the quote pipeline is much "thinner" than the order pipeline, and the quote activity level is much higher than the order activity level. By isolating the market maker quote book, which needs to be updated much more often than the order book, the order matching engine 21 does not need to thrash unnecessarily to constantly update a combined book of quotes and orders. In this embodiment, away market best bid and offer ("BBO") quotes 25a are maintained in another data structure 25, further optimizing performance.

Receiving an Incoming Market Maker Bid

Figure 3A:
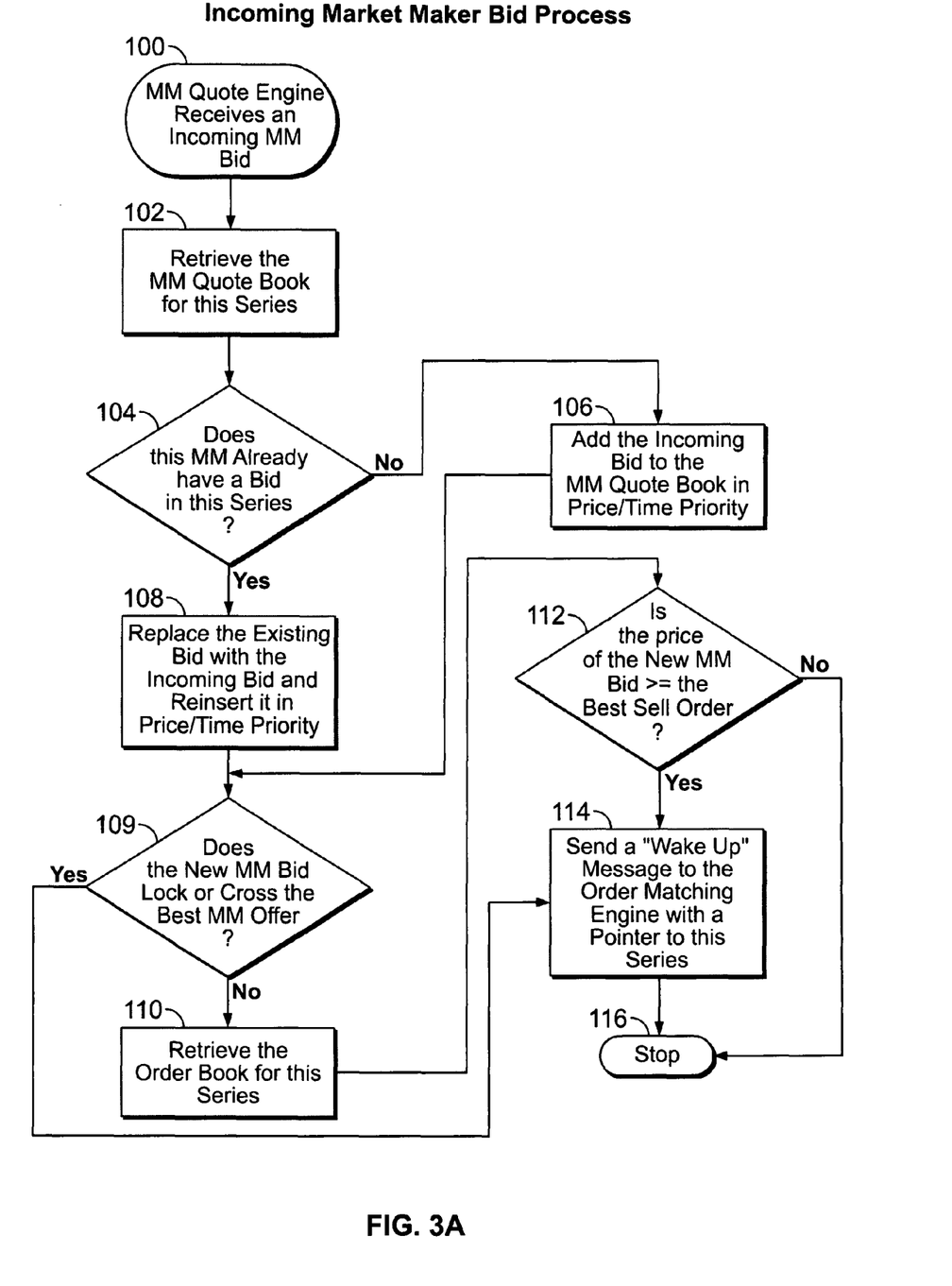
FIGS. 3A-3B are flow diagrams illustrating processes for receiving market maker bids and offers in an embodiment of the present invention.

Referring to FIG. 3A, at step 100, the market maker quote engine 32b receives an incoming market maker bid, and the market maker quote engine process is initiated. At step 102, the process retrieves the market maker quote book 33a for this option series from the market maker quote data structure 33. At step 104, the process checks whether the market maker that sent the bid already has a bid in this option series. If the market maker does not already have a bid in this series, then the process continues to step 106, where it adds the incoming bid to the market maker quote book 33a in price/time priority and proceeds to step 109. If, however, at step 104, the process determines that the market maker does already have a bid in this series, then the process continues to step 108, where it replaces the prior bid with the incoming bid, and re-ranks the quote according to its new price/time priority. By way of explanation, according to the business rules of the market center in this embodiment, a market maker is only allowed to publish one bid per option series.

The process continues to step 109, where it checks if the new market maker bid locks or crosses the best market maker offer. If it does, then the process proceeds to step 114, where the process generates a "wake up" message for the order matching engine 21. It should be noted that the locked/crossed best bid and offer (BBO) is not disseminated publicly. The "wake up" message in this embodiment includes a pointer to the option series so that the order matching engine 21 immediately knows which series to evaluate. The process then terminates in step 116 as indicated.

Returning to step 109, if, however, the new market maker bid does not overlap with the best market maker offer, then the process continues to step 110, where it retrieves the order book 29a for this option series from the order book data structure 29. Then, at step 112, the process checks if the price of the new market maker bid is greater than or equal to the best sell order. If the price of the new bid is inferior, then the process terminates as indicated at step 116.

If, however, the price of the new market maker bid is greater than or equal to the best sell order, then the process continues to step 114, where, as before, it generates a "wake up" message with a pointer to the option series so that the order matching engine 21 immediately knows which series to evaluate. The locked/crossed BBO is not disseminated publicly. The process then terminates as indicated at step 116.

Receiving an Incoming Market Maker Offer

Figure 3B:
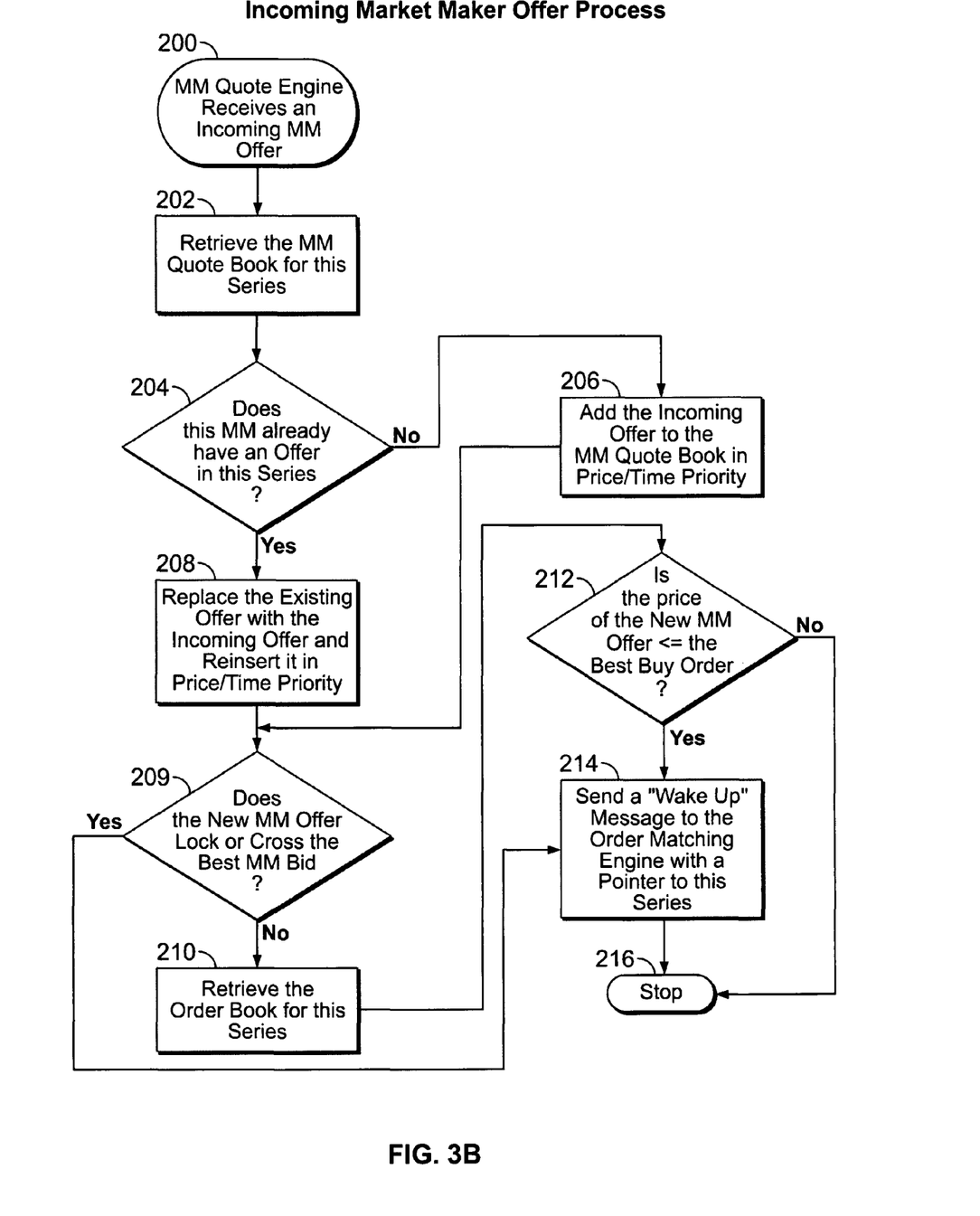

Referring to FIG. 3B, similar to the process for receiving an incoming market maker bid, at step 200, the market maker quote engine 32b receives an incoming market maker offer, and the market maker quote engine process is initiated. At step 202, the process retrieves the market maker quote book 33a for this option series from the market maker quote data structure 33. At step 204, the process checks whether the market maker that sent the offer already has an offer in this option series. If the market maker does not already have an offer in this series, then the process continues to step 206, where it adds the incoming offer to the market maker quote book 33a in price/time priority and proceeds to step 209. If, however, at step 204, the process determines that the market maker does already have an offer in this series, then the process continues to step 208, where it replaces the prior offer with the incoming offer, and re-ranks the quote according to its new price/time priority. By way of explanation, according to the business rules of the market center in this embodiment, a market maker is only allowed to publish one offer per option series.

The process continues to step 209, where it checks if the new market maker offer locks or crosses the best market maker bid. If it does, then the process proceeds to step 214, where the process generates a "wake up" message for the order matching engine 21. As described above, it should be noted that the locked/crossed best bid and offer (BBO) is not disseminated publicly. The "wake up" message in this embodiment includes a pointer to the option series so that the order matching engine 21 immediately knows which series to evaluate. The process then terminates as indicated at step 216.

Returning to step 209, if, however, the new market maker offer does not overlap with the best market maker bid, then the process continues to step 210, where it retrieves the order book 29a for this option series from the order book data structure 29. Then, at step 212, the process checks if the price of the new market maker offer is less than or equal to the best buy order. If the price of the new offer is inferior, then the process terminates as indicated at step 216.

If, however, the price of the new market maker offer is less than or equal to the best buy order, then the process continues to step 214, where, as before, it generates a "wake up" message with a pointer to the option series so that the order matching engine 21 immediately knows which series to evaluate. The locked/crossed BBO is not disseminated publicly. The process then terminates as indicated at step 216.

Order Matching Engine Receives "Wake Up" Message

Figure 4A:
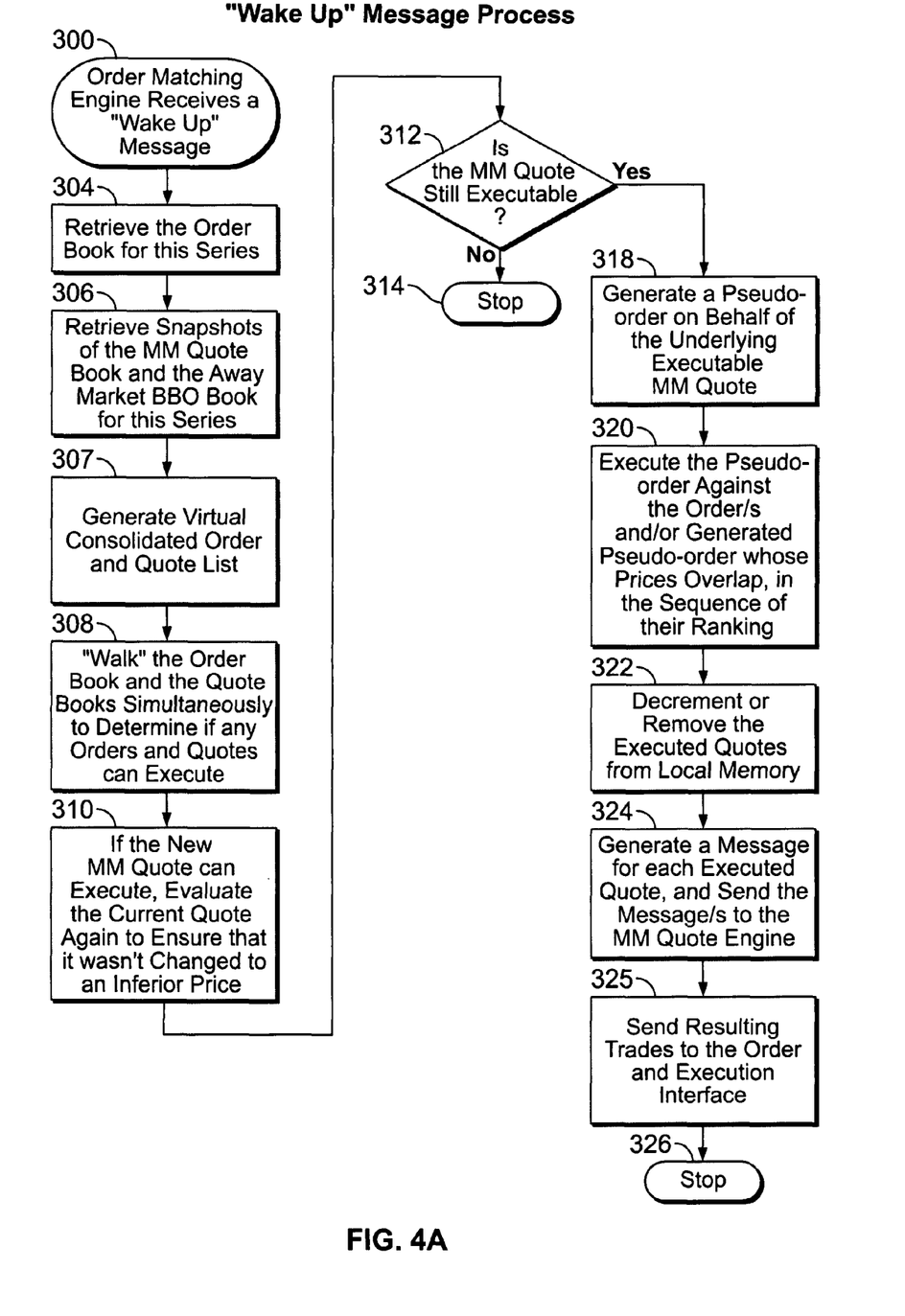
FIG. 4A is a flow diagram illustrating a process in an embodiment of the present invention, wherein an order matching engine reacts to a received "wake up" alert message.
Figure 4B:
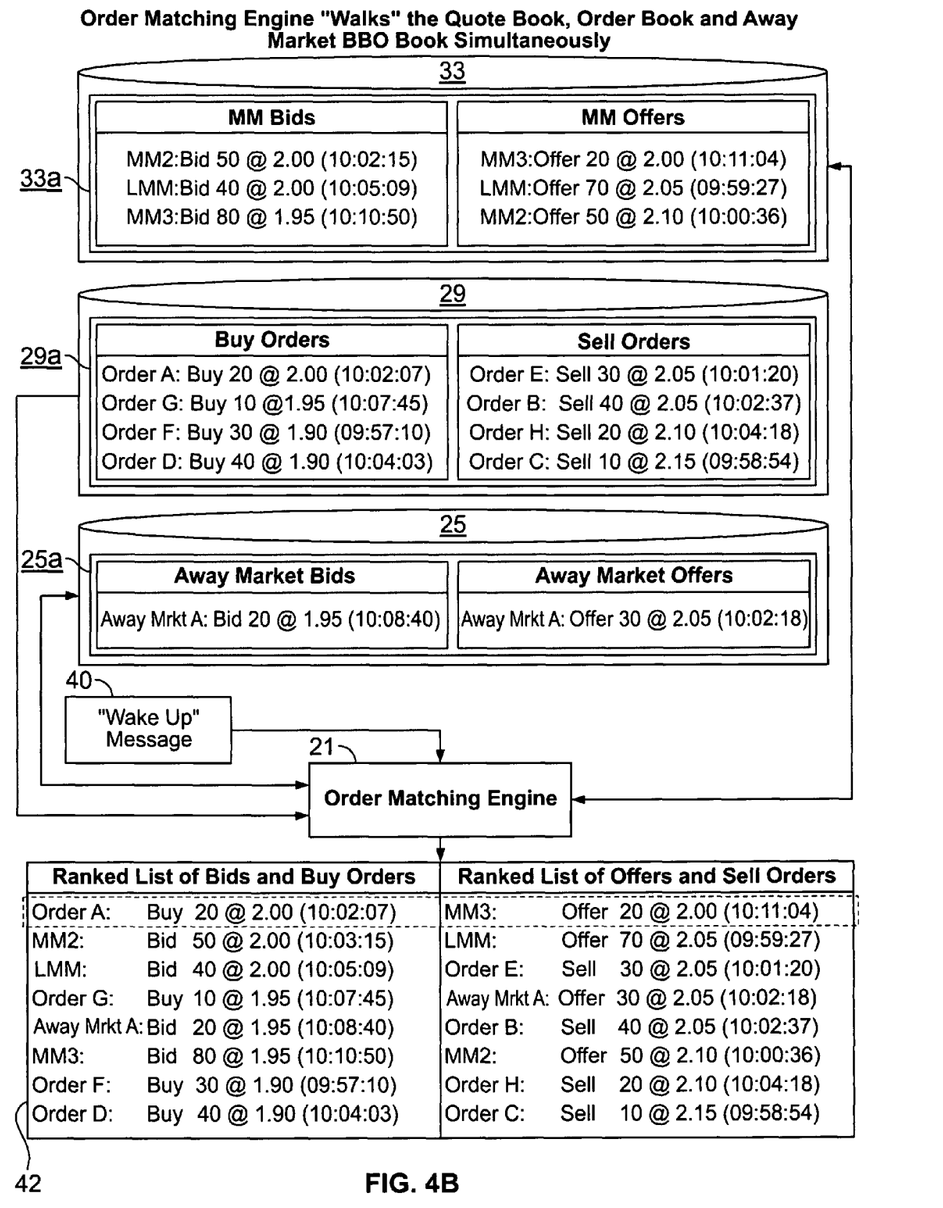
FIG. 4B is an exemplary depiction of the generation of a virtual consolidated order and quote list of the present invention.

Referring to FIGS. 4A and 4B, the order matching engine 21 receives a "wake up" message from the market maker quote engine 32b, as described above, alerting it to a possible execution opportunity in a specific option series, as indicated at step 300. The order matching engine 21 in response, and as described below, evaluates the orders and quotes, executes them if a match is possible, and notifies the market maker quote engine 32b if any quotes need to be decremented or canceled due to the executions.

At step 304 in FIG. 4A and as depicted in FIG. 4B, the process retrieves the order book 29a for the designated option series. At step 306 in FIG. 4A and as depicted in FIG. 4B, the process retrieves a snapshot of the market maker quote book 33a for the designated option series, and a snapshot of the away market BBO book 25a for the designated option series. At step 307, the process combines the retrieved order book 29a, the retrieved market maker quote book 33a and the retrieved away market BBO book 25a to create a virtual consolidated order and quote list 42. The virtual consolidated order and quote list 42 is a temporary, virtual list and is not maintained as a separate, standing order and quote book in this embodiment. The underlying orders and quotes are maintained in their separate data structures. The virtual consolidated order and quote list 42 is assembled so that the order matching engine 21 can "walk" the list 42 as described below.

Specifically, at step 308, after the virtual consolidated order and quote list 42 is generated, the process then "walks" both sides of the virtual consolidated order and quote list 42 simultaneously, starting with the highest-ranked bid and the highest-ranked offer to determine if there is an overlap between the best bid prices and the best offer prices. The process then proceeds to step 310 to determine if the new market maker quote can execute. If the new market maker quote can execute, then, at step 312, the process checks the active market maker quote book 33a again to determine if it is still executable, specifically to ensure that the new market maker quote has not been changed to an inferior price during the brief interval in which the order matching engine 21 was "walking" the list 42, i.e. the quote price in the snapshot is not stale. If, at step 312, the process determines that the market maker quote is no longer marketable, then the process terminates as indicated at step 314.

If, however, the current market maker quote is still marketable, then the process continues to step 318, where it generates an immediate-or-cancel ("IOC") pseudo-order on behalf of the underlying executable market maker quote. At step 320, the process then executes the generated pseudo-order against any resting orders and/or resting market maker quotes whose prices overlap with the pseudo-order, in the sequence of their ranking. It should be noted that in this embodiment, market makers are responsible for transmitting their own linkage orders to other market centers if a market maker quote locks or crosses an away market quote. As such, pseudo-orders are not routed to away market quotes. In this embodiment, the resting orders and/or quotes are executed according to price/time priority, but with a preference for displayed interest over nondisplayed ("working") order types. Accordingly, if any non-displayed, order types are executable against the pseudo-order, then the non-displayed order types are executed only after all displayed orders and quotes at the same price execute first.

If any resting market maker quotes are executable against the pseudo-order created on behalf of the new market maker quote, then the process also generates an IOC pseudo-order on behalf of each resting market maker quote that can execute. As indicated at step 322, the process decrements or removes the executed quotes from local memory. It should be noted that in this embodiment, at this point in the process, the quotes are depleted or decremented in the order matching engine's local memory only and do not affect the published quotes yet.

At step 324, for each market maker quote that executed, the process sends an "executed quote" message to the market maker quote engine 32b informing it of the quantity of contracts executed and the quantity remaining, if any. The process, as indicated at step 325, also sends the resulting trade information to the order and execution interface 28, which in turn sends the fills to the order sending firms 26 and the market maker firms 31. The process then terminates in step 326 as indicated.

Figure 5:
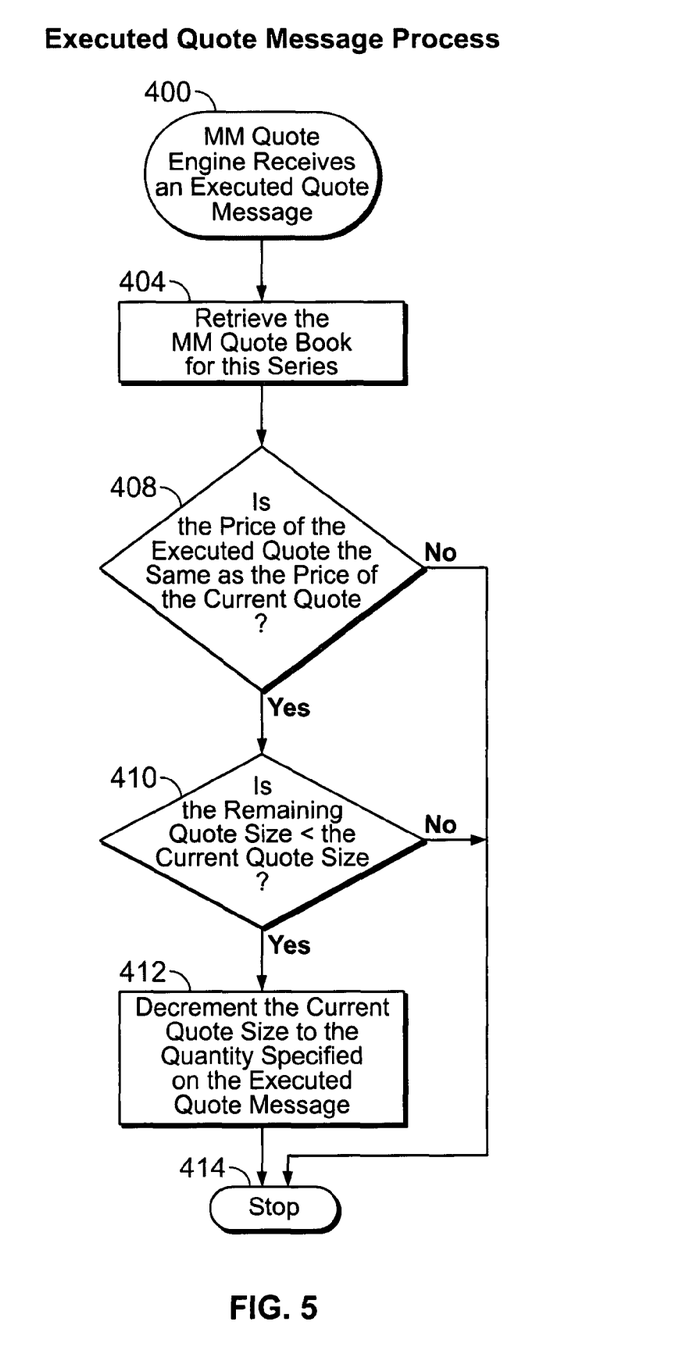
FIG. 5 is a flow diagram illustrating a process in an embodiment of the present invention, wherein a market maker quote engine receives an executed quote message.

Market Maker Quote Engine Receives an Executed Quote Message from the Order Matching Engine Referring to FIG. 5, at step 400, the market maker quote engine 32b receives an executed quote message from the order matching engine 21, and the process is initiated. At step 404, the process retrieves the market maker quote book 33a for the option series. At step 408, the process checks if the price of the executed quote is the same as the price of the current quote. If the prices are different, then the process terminates as indicated at step 414. If, however, the prices are equal, then the process continues to step 410, where it checks if the remaining quote size reported on the message is less than the current quote size. If the remaining quote size is indeed lower, then the process continues to step 412, where it decrements the current quote size to the remaining quote size specified on the executed quote message. The process then terminates as indicated at step 414.

Returning to step 410, if, however, the remaining quote size reported on the message is greater than or equal to the current quote size, then the process does not replace the current quote, and terminates as indicated at step 414. Accordingly, the process automatically decreases (but does not automatically increase) the size of a current quote.

DETAILED EXAMPLES

Examples of how quotes and orders are processed in a preferred embodiment of the invention are provided below. It should be understood that the order and quote prices and sizes discussed in these examples are by way of example only to illustrate how the process of an embodiment of the invention operates. Quote and order processing is not limited to these examples.

In the examples below, the option series has three appointed market makers: LMM, MM2, and MM3. In the first example, market maker MM2 sends a new nonmarketable bid, which simply replaces its current bid. In the second example, market maker MM3 sends a new offer, whose price is marketable against a posted buy order and is also marketable against the bid from market maker MM2. As illustrated in these examples, the order matching engine 21 is not notified of the nonmarketable quote update, and is only notified of the marketable quote update.

At the start of these examples, the various books appear as shown below.

→The NBBO is 2.00 to 2.05 (50×240)

For ease of illustration, the quotes from only two away market centers 24 are shown. The away market BBO book 25a looks like this:

| Away Market Bids | Away Market Offers |
| --- | --- |
| Away Market A: Bid 30 @ 2.00 (10:00:03) | Away Market B: Offer 40 @ 2.05 (10:01:02) |
| Away Market B: Bid 60 @ 1.95 (09:59:57) | Away Market A: Offer 50 @ 2.10 (10:00:30) |

The market maker quote book 33*a* looks like this:

| Market Maker Bids | Market Maker Offers |
| --- | --- |
| LMM: Bid 40 @ 1.95 (10:03:09) | LMM: Offer 70 @ 2.05 (10:00:27) |
| MM2: Bid 50 @ 1.95 (10:03:15) | MM3: Offer 60 @ 2.05 (10:02:05) |
| MM3: Bid 80 @ 1.95 (10:03:50) | MM2: Offer 50 @ 2.10 (10:00:36) |

The order book 29*a* looks like this:

| Buy Orders | Sell Orders |
| --- | --- |
| Order A: Buy 20 @ 2.00 (10:02:07) | Order E: Sell 30 @ 2.05 (10:01:20) |
| Order G: Buy 10 @ 1.95 (10:02:45) | Order B: Sell 40 @ 2.05 (10:02:37) |
| Order F: Buy 30 @ 1.90 (09:57:10) | Order H: Sell 60 @ 2.10 (10:03:43) |
| Order D: Buy 50 @ 1.90 (10:04:03) | Order C: Sell 40 @ 2.15 (09:58:04) |

→The market center BBO is 2.00 to 2.05 (20×200)

The public order book looks like this:

| Bids | Offers |
| --- | --- |
| 20 @ 2.00 | 200 @ 2.05 |
| 180 @ 1.95 | 110 @ 2.10 |
| 80 @ 1.90 | 40 @ 2.15 |

Market Maker MM2 Sends a Nonmarketable Bid

Referring to FIG. 3A, at step 100 in this example, the market maker quote engine 32*b* receives the following bid from market maker MM2:

Bid 50@2.00

At step 102, the initiated process retrieves the market maker quote book 33*a* for this series. At step 104, the process checks if MM2 already has a bid in this series. As shown below, a bid for MM2 does already exist:

| Market Maker Bids | Market Maker Offers |
| --- | --- |
| LMM: Bid 40 @ 1.95 (10:03:09) | LMM: Offer 70 @ 2.05 (10:00:27) |
| → MM2: Bid 50 @ 1.95 (10:03:15) | MM3: Offer 60 @ 2.05 (10:02:05) |
| MM3: Bid 80 @ 1.95 (10:03:50) | MM2: Offer 50 @ 2.10 (10:00:36) |

As a bid for MM2 already exists, the process continues to step 108, where it replaces the current bid with the incoming bid and updates its timestamp. At step 109, the process checks if the new MM2 bid (2.00) locks or crosses the best market maker offer (2.05). As it does not, the process continues to step 110.

The market maker quote book 33*a* now looks like this:

| Market Maker Bids | Market Maker Offers |
| --- | --- |
| → MM2: Bid 50 @ 2.00 (10:04:15) | LMM: Offer 70 @ 2.05 (10:00:27) |
| LMM: Bid 40 @ 1.95 (10:03:09) | MM3: Offer 60 @ 2.05 (10:02:05) |
| MM3: Bid 80 @ 1.95 (10:03:50) | MM2: Offer 50 @ 2.10 (10:00:36) |

At step 110, the process retrieves the order book for this option series. The order book 29*a* looks like this:

| Buy Orders | Sell Orders |
| --- | --- |
| Order A: Buy 20 @ 2.00 (10:02:07) | Order E: Sell 30 @ 2.05 (10:01:20) |
| Order G: Buy 10 @ 1.95 (10:02:45) | Order B: Sell 40 @ 2.05 (10:02:37) |
| Order F: Buy 30 @ 1.90 (09:57:10) | Order H: Sell 60 @ 2.10 (10:03:43) |
| Order D: Buy 50 @ 1.90 (10:04:03) | Order C: Sell 40 @ 2.15 (09:58:04) |

In step 112, the process checks if the new MM2 bid price (2.00) is greater than or equal to the best sell order (2.05). As the new MM2 bid price is inferior to the best sell order, the process terminates in step 116 as indicated.

→The market center BBO is now 2.00 to 2.05 (70×200)

The public order book looks like this:

| Bids | Offers |
| --- | --- |
| → 70 @ 2.00 | 200 @ 2.05 |
| → 130 @ 1.95 | 110 @ 2.10 |
| 80 @ 1.90 | 40 @ 2.15 |

Market Maker MM3 Sends a Marketable Offer

Referring to FIG. 3B, at step 200 in this example, the market maker quote engine 32*b* receives the following offer from market maker MM3:

Offer 60@2.00

At step 202, the process retrieves the market maker quote book 33*a* for this series. At step 204, the process checks if MM3 already has an offer in this series. As shown below, an offer for MM3 does already exist:

| Market Maker Bids | Market Maker Offers |
| --- | --- |
| MM2: Bid 50 @ 2.00 (10:04:15) | LMM: Offer 70 @ 2.05 (10:00:27) |
| LMM: Bid 40 @ 1.95 (10:03:09) | → MM3: Offer 60 @ 2.05 (10:02:05) |
| MM3: Bid 80 @ 1.95 (10:03:50) | MM2: Offer 50 @ 2.10 (10:00:36) |

As an offer for MM3 already exists, the process continues to step 208, where it replaces the current offer with the incoming offer and updates its timestamp. It should be noted that although the MM3 offer has now caused the market maker quote book 33*a* to become locked, the market maker quote engine 32*b* does not disseminate the MM3 offer to the marketplace, as that would result in the market center 20 generating a locked BBO quotation.

The market maker quote book 33*a* momentarily looks like this:

| Market Maker Bids | Market Maker Offers |
|---|---|
| MM2: Bid 50 @ 2.00 (10:04:15) | → MM3: Offer 60 @ 2.00 (10:05:05) |
| LMM: Bid 40 @ 1.95 (10:03:09) | LMM: Offer 70 @ 2.05 (10:00:27) |
| MM3: Bid 80 @ 1.95 (10:03:50) | MM2: Offer 50 @ 2.10 (10:00:36) |

At step 209, the process checks if the new market maker offer locks or crosses the best market maker bid. As the MM3 offer (2.00) is the same price as the MM2 bid (2.00), the process continues to step 214, where it sends a "wake up" message to the order matching engine 21, alerting it that this series must be evaluated for an execution. The process then terminates in step 216 as indicated.

Order Matching Engine Retrieves the Order Book and Quote Books and Combines them into Ranked Lists Referring to FIG. 4A, at step 300, the process receives the "wake up" message from the market maker quote engine 32b, alerting it to the execution opportunity in this series. At step 304, the process retrieves the order book 29a for the series.

The order book 29a remains the same and still looks like this:

| Buy Orders | Sell Orders |
|---|---|
| Order A: Buy 20 @ 2.00 (10:02:07) | Order E: Sell 30 @ 2.05 (10:01:20) |
| Order G: Buy 10 @ 1.95 (10:02:45) | Order B: Sell 40 @ 2.05 (10:02:37) |
| Order F: Buy 30 @ 1.90 (09:57:10) | Order H: Sell 60 @ 2.10 (10:03:43) |
| Order D: Buy 50 @ 1.90 (10:04:03) | Order C: Sell 40 @ 2.15 (09:58:04) |

At step 306, the process takes a snapshot of the market maker quote book 33a for this series and a snapshot of the away market BBO book 25a for this series and retrieves the snapshots. By way of explanation, as the quote books are too volatile to freeze for the duration of the evaluation and execution, a snapshot is taken and read into a local buffer for processing by the order matching engine 21.

The away market BBO book 25a remains unchanged and still looks like this:

| Away Market Bids | Away Market Offers |
|---|---|
| Away Market A: Bid 30 @ 2.00 (10:00:03) | Away Market B: Offer 40 @ 2.05 (10:01:02) |
| Away Market B: Bid 60 @ 1.95 (09:59:57) | Away Market A: Offer 50 @ 2.10 (10:00:30) |

The market maker quote book 33a is momentarily locked and looks like this:

| Market Maker Bids | Market Maker Offers |
|---|---|
| MM2: Bid 50 @ 2.00 (10:04:15) | → MM3: Offer 60 @ 2.00 (10:05:05) |
| LMM: Bid 40 @ 1.95 (10:03:09) | LMM: Offer 70 @ 2.05 (10:00:27) |
| MM3: Bid 80 @ 1.95 (10:03:50) | MM2: Offer 50 @ 2.10 (10:00:36) |

At step 307, the process generates a virtual consolidated order and quote list 42. It does this by combining the order book 29a, the snapshot of the market quote book 33a, and the snapshot of the away market BBO book 25a together into a single ranked list of bids and a single ranked list of offers. As the order book does not presently contain any "working" orders, the market maker quotes and the orders are ranked according to strict price/time priority. As resident trading interest always has priority over nonresident trading interest at the same price level, the market maker quotes and the orders are ranked ahead of the away market quotes at the same price level.

Accordingly, the ranked list of bids looks like this:

| Ranked Bids |
|---|
| Order A: Buy 20 @ 2.00 (10:02:07) |
| MM2: Bid 50 @ 2.00 (10:04:15) |
| Away Market A: Bid 30 @ 2.00 (10:00:03) |
| Order G: Buy 10 @ 1.95 (10:02:45) |
| LMM: Bid 40 @ 1.95 (10:03:09) |
| MM3: Bid 80 @ 1.95 (10:03:50) |
| Away Market B: Bid 60 @ 1.95 (10:02:57) |
| Order F: Buy 30 @ 1.90 (09:57:10) |
| Order D: Buy 50 @ 1.90 (10:04:03) |

The ranked list of offers looks like this:

| Sell Orders |
|---|
| MM3: Offer 60 @ 2.00 (10:05:05) |
| LMM: Offer 70 @ 2.05 (10:00:27) |
| Order E: Sell 30 @ 2.05 (10:01:20) |
| Order B: Sell 40 @ 2.05 (10:02:37) |
| Away Market B: Offer 40 @ 2.05 (10:01:02) |
| MM2: Offer 50 @ 2.10 (10:00:36) |
| Order H: Sell 60 @ 2.10 (10:03:43) |
| Away Market A: Offer 50 @ 2.10 (10:00:30) |
| Order C: Sell 40 @ 2.15 (09:58:04) |

The ranked list of bids and the ranked list of offers form the virtual consolidated order and quote list 42, which momentarily looks like this:

| | Buy Orders | | Sell Orders |
|---|---|---|---|
| Order A: | Buy 20 @ 2.00 (10:02:07) | MM3: | Offer 60 @ 2.00 (10:05:05) |
| MM2: | Bid 50 @ 2.00 (10:04:15) | LMM: | Offer 70 @ 2.05 (10:00:27) |
| Away Market A: | Bid 30 @ 2.00 (10:00:03) | Order E: | Sell 30 @ 2.05 (10:01:20) |
| Order G: | Buy 10 @ 1.95 (10:02:45) | Order B: | Sell 40 @ 2.05 (10:02:37) |
| LMM: | Bid 40 @ 1.95 (10:03:09) | Away Market B: | Offer 40 @ 2.05 (10:01:02) |
| MM3: | Bid 80 @ 1.95 (10:03:50) | MM2: | Offer 50 @ 2.10 (10:00:36) |
| Away Market B: | Bid 60 @ 1.95 (10:02:57) | Order H: | Sell 60 @ 2.10 (10:03:43) |
| Order F: | Buy 30 @ 1.90 (09:57:10) | Away Market A: | Offer 50 @ 2.10 (10:00:30) |
| Order D: | Buy 50 @ 1.90 (10:04:03) | Order C: | Sell 40 @ 2.15 (09:58:04) |

Order Matching Engine Creates a Pseudo-Order on Behalf of the MM3 Offer, and Matches a Posted Buy Order At step 308, the process "walks" the virtual consolidated order and quote list 42 to evaluate the execution opportunities, and determines that the MM3 offer is marketable against Buy Order A and the MM2 bid. At step 310, the process retrieves the MM3 offer again from the market maker quote book 33a to ensure that its price has not changed during the brief interval in which it was evaluating the virtual consolidated order and quote list 42. As the MM3 offer has not changed in this example, in step 312, the process determines that the MM3 offer is still marketable.

At step 318, the process creates a pseudo-order on behalf of the MM3 offer:

Order PSO1: Sell 60@2.00, IOC

In step 320, the process retrieves the best bid, Buy Order A, and matches 20 contracts of Buy Order A at the price of 2.00, completely depleting Buy Order A and removing it from the books. Pseudo-order PSO1 (and the underlying MM3 offer) still have 40 contracts available to trade.

The order book 29a looks like this:

| Buy Orders | | Sell Orders | |
|---|---|---|---|
| Order G: | Buy 10 @ 1.95 (10:02:45) | Order E: | Sell 30 @ 2.05 (10:01:20) |
| Order F: | Buy 30 @ 1.90 (09:57:10) | Order B: | Sell 40 @ 2.05 (10:02:37) |
| Order D: | Buy 50 @ 1.90 (10:04:03) | Order H: | Sell 60 @ 2.10 (10:03:43) |
| | | Order C: | Sell 40 @ 2.15 (09:58:04) |

The virtual consolidated order and quote list 42 momentarily looks like this:

| Buy Orders | | Sell Orders | |
|---|---|---|---|
| MM2: | Bid 50 @ 2.00 (10:04:15) | → MM3: | Offer 40 @ 2.00 (10:05:05) |
| Away Market A: | Bid 30 @ 2.00 (10:00:03) | LMM: | Offer 70 @ 2.05 (10:00:27) |
| Order G: | Buy 10 @ 1.95 (10:02:45) | Order E: | Sell 30 @ 2.05 (10:01:20) |
| LMM: | Bid 40 @ 1.95 (10:03:09) | Order B: | Sell 40 @ 2.05 (10:02:37) |
| MM3: | Bid 80 @ 1.95 (10:03:50) | Away Market B: | Offer 40 @ 2.05 (10:01:02) |
| Away Market B: | Bid 60 @ 1.95 (10:02:57) | MM2: | Offer 50 @ 2.10 (10:00:36) |
| Order F: | Buy 30 @ 1.90 (09:57:10) | Order H: | Sell 60 @ 2.10 (10:03:43) |
| Order D: | Buy 50 @ 1.90 (10:04:03) | Away Market A: | Offer 50 @ 2.10 (10:00:30) |
| | | Order C: | Sell 40 @ 2.15 (09:58:04) |

Order Matching Engine Creates a Pseudo-Order on Behalf of the MM2 Bid, and Matches the MM3 Sell Pseudo-Order Against the MM2 Buy Pseudo-Order Still at step 320, the process determines that pseudo-order PSO1 is also marketable against the MM2 bid. Accordingly, the process also checks the MM2 bid again in the market maker quote book 33a to ensure that its price has not changed during the interval while the virtual consolidated order and quote list 42 is being evaluated. The MM2 bid has not changed in this example.

The process creates a pseudo-order on behalf of the MM2 bid:

Order PSO2: Buy 50@ 2.00, IOC

The process matches the remaining 40 contracts of pseudo-order PSO1 against 40 contracts of pseudo-order PSO2 at the price of 2.00, completely depleting pseudo-order PSO1. The remaining 10 contracts of pseudo-order PSO2 are immediately canceled. In step 322, the process decrements the MM3 offer by the quantity traded, completely depleting the MM3 offer and removing it from the virtual consolidated order and quote list 42. The MM2 bid still has 10 contracts remaining.

The virtual consolidated order and quote list 42 looks like this:

| Buy Orders | | Sell Orders | |
|---|---|---|---|
| → MM2: | Bid 10 @ 2.00 (10:04:15) | LMM: | Offer 70 @ 2.05 (10:00:27) |
| Away Market A: | Bid 30 @ 2.00 (10:00:03) | Order E: | Sell 30 @ 2.05 (10:01:20) |
| Order G: | Buy 10 @ 1.95 (10:02:45) | Order B: | Sell 40 @ 2.05 (10:02:37) |
| LMM: | Bid 40 @ 1.95 (10:03:09) | Away Market B: | Offer 40 @ 2.05 (10:01:02) |
| MM3: | Bid 80 @ 1.95 (10:03:50) | MM2: | Offer 50 @ 2.10 (10:00:36) |
| Away Market B: | Bid 60 @ 1.95 (10:02:57) | Order H: | Sell 60 @ 2.10 (10:03:43) |
| Order F: | Buy 30 @ 1.90 (09:57:10) | Away Market A: | Offer 50 @ 2.10 (10:00:30) |
| Order D: | Buy 50 @ 1.90 (10:04:03) | Order C: | Sell 40 @ 2.15 (09:58:04) |

As no further additional orders or quotes can execute at the present time, the virtual consolidated order and quote list 42 is deleted from local memory.

Order Matching Engine Notifies the Market Maker Quote Engine of the executed MM3 Offer Quantity and the Executed MM2 Bid Quantity At step 324, the process generates an executed quote message on behalf of the MM3 offer:

→MM3 Offer (60@2.00) executed 60, Leaves quantity=0

The process also generates an executed quote message on behalf of the MM2 bid:

→MM2 Bid (50@2.00) executed 40, Leaves quantity=10

The process sends the two executed quote messages to the market maker quote engine 32b. At step 325, the process sends the execution reports to the order and execution interface 28. The trade for Order A is reported to the appropriate order sending firm 26, the trade for the MM3 offer is reported to market maker MM3, and the trade for the MM2 bid is reported to market maker MM2. The process then terminates in step 326 as indicated.

Market Maker Quote Engine Receives the Executed Quote Message for the MM2 Bid

Referring to FIG. 5, at step 400 in this example, the market maker quote engine 32b receives the executed quote message from the order matching engine 21 regarding the MM2 bid:

→MM2 Bid (50@2.00) executed 40, Leaves quantity=10

In step 404, it retrieves the market maker quote book 33a for the series. The market maker quote book 33a is still momentarily locked and looks like this:

| Market Maker Bids | | Market Maker Offers | |
|---|---|---|---|
| MM2: | Bid 50 @ 2.00 (10:04:15) | MM3: | Offer 60 @ 2.00 (10:05:05) |
| LMM: | Bid 40 @ 1.95 (10:03:09) | LMM: | Offer 70 @ 2.05 (10:00:27) |
| MM3: | Bid 80 @ 1.95 (10:03:50) | MM2: | Offer 50 @ 2.10 (10:00:36) |

In step 408, the process checks if the price of the MM2 bid on the executed quote message (2.00) is the same as the current published MM2 bid (2.00). As the prices are equal, the process continues to step 410, where it checks if the remaining quote size (10) of the MM2 bid on the executed quote message is less than the current published MM2 bid size (50). As the remaining quote size on the message is less, the process continues to step 412, where the market maker quote engine 32b decrements the current published quote size to 10 contracts.

The updated market maker quote book 33a now looks like this:

| Market Maker Bids | | Market Maker Offers | |
|---|---|---|---|
| → MM2: | Bid 10 @ 2.00 (10:04:15) | MM3: | Offer 60 @ 2.00 (10:05:05) |
| LMM: | Bid 40 @ 1.95 (10:03:09) | LMM: | Offer 70 @ 2.05 (10:00:27) |
| MM3: | Bid 80 @ 1.95 (10:03:50) | MM2: | Offer 50 @ 2.10 (10:00:36) |

MM3 Sends a New Offer Before Receiving the Fill from the Prior Execution

In this example, in the brief interval before the market maker quote engine 32b receives the executed quote message for the MM3 offer, market maker MM3 sends a new offer:

Offer 40@2.05

Referring to FIG. 3B, at step 202, the market maker quote engine 32b retrieves the market maker quote book 33a for the series.

The market maker quote book 33a currently looks like this:

| Market Maker Bids | | Market Maker Offers | |
|---|---|---|---|
| MM2: | Bid 10 @ 2.00 (10:04:15) | MM3: | Offer 60 @ 2.00 (10:05:05) |
| LMM: | Bid 40 @ 1.95 (10:03:09) | LMM: | Offer 70 @ 2.05 (10:00:27) |
| MM3: | Bid 80 @ 1.95 (10:03:50) | MM2: | Offer 50 @ 2.10 (10:00:36) |

In step 204, the process checks if market maker MM3 already has an offer for this series. As it does, the process continues to step 208, where it replaces the current MM3 offer with the new MM3 offer and ranks the new offer in price/time priority.

The updated market maker quote book 33a now looks like this:

| Market Maker Bids | | Market Maker Offers | |
|---|---|---|---|
| MM2: | Bid 10 @ 2.00 (10:04:15) | LMM: | Offer 70 @ 2.05 (10:00:27) |
| LMM: | Bid 40 @ 1.95 (10:03:09) | → MM3: | Offer 40 @ 2.05 (10:05:06) |
| MM3: | Bid 80 @ 1.95 (10:03:50) | MM2: | Offer 50 @ 2.10 (10:00:36) |

In step 209, the process checks if the new market maker offer (2.05) locks or crosses the best market maker bid (2.00). As it does not, at step 210, the process retrieves the order book for the option series.

The order book 29a looks like this:

| Buy Orders | | Sell Orders | |
|---|---|---|---|
| Order G: | Buy 10 @ 1.95 (10:02:45) | Order E: | Sell 30 @ 2.05 (10:01:20) |
| Order F: | Buy 30 @ 1.90 (09:57:10) | Order B: | Sell 40 @ 2.05 (10:02:37) |
| Order D: | Buy 50 @ 1.90 (10:04:03) | Order H: | Sell 60 @ 2.10 (10:03:43) |
| | | Order C: | Sell 40 @ 2.15 (09:58:04) |

In step 212, the process checks if the new MM3 offer (2.05) is less than or equal to the best buy order. As it is not, the MM3 offer is not marketable, and the process terminates in step 216 as indicated. As the market maker quote book 33a is no longer locked, the new MM3 offer is disseminated to the public order book and the market center BBO is updated.

→The market center BBO is now 2.00 to 2.05 (10×180)

The public order book looks like this:

| Bids | Offers |
|---|---|
| → 10 @ 2.00 | → 180 @ 2.05 |
| 130 @ 1.95 | 110 @ 2.10 |
| 80 @ 1.90 | 40 @ 2.15 |

Market Maker Quote Engine Receives the Executed Quote Message for the Prior MM3 Offer Referring to FIG. 5, at step 400 in this example, the market maker quote engine 32b receives the executed quote message from the order matching engine 21 regarding the MM3 offer:

→MM3 Offer (60@2.00) executed 60, Leaves quantity=0

In step 404, it retrieves the market maker quote book 33a for the series:

| Market Maker Bids | | Market Maker Offers | |
|---|---|---|---|
| MM2: | Bid 10 @ 2.00 (10:04:15) | LMM: | Offer 70 @ 2.05 (10:00:27) |
| LMM: | Bid 40 @ 1.95 (10:03:09) | MM3: | Offer 40 @ 2.05 (10:05:06) |
| MM3: | Bid 80 @ 1.95 (10:03:50) | MM2: | Offer 50 @ 2.10 (10:00:36) |

In step 408, the process checks if the price of the MM3 offer on the executed quote message (2.00) is the same as the current published MM3 offer (2.05). As the prices are not equal, the process continues to step 414, where it terminates as indicated. As shown in this example, the market maker quote engine 32b does not reduce the quote size of the current MM3 offer because its price is different from that of the previous MM3 offer that executed above.

The state of the various books at the conclusion of these examples is shown below.

→The NBBO is 2.00 to 2.05 (40×220)

The away market BBO book 25a remains unchanged and still looks like this:

| Away Market Bids | | Away Market Offers | |
|---|---|---|---|
| Away Market A: | Bid 30 @ 2.00 (10:00:03) | Away Market B: | Offer 40 @ 2.05 (10:01:02) |
| Away Market B: | Bid 60 @ 1.95 (09:59:57) | Away Market A: | Offer 50 @ 2.10 (10:00:30) |

The market maker quote book 33a looks like this:

| Market Maker Bids | | Market Maker Offers | |
|---|---|---|---|
| MM2: | Bid 10 @ 2.00 (10:04:15) | LMM: | Offer 70 @ 2.05 (10:00:27) |
| LMM: | Bid 40 @ 1.95 (10:03:09) | MM3: | Offer 40 @ 2.05 (10:05:06) |
| MM3: | Bid 80 @ 1.95 (10:03:50) | MM2: | Offer 50 @ 2.10 (10:00:36) |

The order book 29a looks like this:

| Buy Orders | | Sell Orders | |
|---|---|---|---|
| Order G: | Buy 10 @ 1.95 (10:02:45) | Order E: | Sell 30 @ 2.05 (10:01:20) |
| Order F: | Buy 30 @ 1.90 (09:57:10) | Order B: | Sell 40 @ 2.05 (10:02:37) |
| Order D: | Buy 50 @ 1.90 (10:04:03) | Order H: | Sell 60 @ 2.10 (10:03:43) |
| | | Order C: | Sell 40 @ 2.15 (09:58:04) |

→The market center BBO is 2.00 to 2.05 (10×180)

The public order book looks like this:

| Bids | Offers |
|---|---|
| 10 @ 2.00 | 180 @ 2.05 |
| 130 @ 1.95 | 110 @ 2.10 |
| 80 @ 1.90 | 40 @ 2.15 |

While the invention has been discussed in terms of certain embodiments, it should be appreciated that the invention is not so limited. The embodiments are explained herein by way of example, and there are numerous modifications, variations and other embodiments that may be employed that would still be within the scope of the present invention.

What is claimed is:

1. A computer-implemented method for optimizing throughput, the method comprising:
    generating, in a computing system including at least one memory and at least one processor, an order data pipeline specifically configured to receive orders from one or more order sources,
    generating, in the computing system, a quote data pipeline specifically configured to receive quotes from pre-validated quote sources, the quote data pipeline being separate from the order data pipeline;
    receiving, by the quote data pipeline, a market maker quote and transferring the market maker quote to a market maker quote engine of the computing system specifically configured to process quotes;
    storing, by the market maker quote engine, the market maker quote in a market maker quote book in the at least one memory having one or more other quotes, wherein the market maker quote book includes quotes, but no orders;
    receiving, by the order data pipeline, orders from the one or more order sources and transferring said orders to at least one order routine specifically configured to process orders;
    storing, by the at least one order routine each received order in an order book in the at least one memory, wherein the order book includes orders, but no quotes, wherein the market maker quote book and the order book are stored in physically separated data structures;
    determining, by the market maker quote engine, whether the market maker quote is marketable against one or more of a contra-side market maker quote in the market maker quote book or a contra-side market center order in the order book;
    responsive to determining that the market maker quote is marketable:
        generating, by the market maker quote engine, an alert message;
        transmitting, by the market maker quote engine, the alert message to an order matching engine of the computing system;
    responsive to receiving, at the order matching engine, the alert message from the market maker quote engine:
        generating, by the order matching engine, a virtual list separate from the market maker quote book and the order book, said generating comprising: taking a temporary snapshot of quotes in the market maker quote book without freezing the market maker quote book and retrieving orders from the order book such that the market maker quote engine continues to process additional quotes, and arranging the snapshot quotes and the retrieved orders according to predetermined criteria;
        matching, by the order matching engine, the market maker quote against one among the snapshot quotes and the retrieved orders in the virtual list to generate a matched trade;
        comparing, by the order matching engine, the market maker quote in the virtual list to a corresponding quote in the market maker quote book to determine whether a price of the market maker quote has changed; and
        executing the matched trade when the price of the market maker quote has not changed.

2. The method of claim 1, wherein the computing system comprises one or more programmed computers.

3. The method of claim 1, wherein the computing system is distributed over several physical locations.

4. The method of claim 1, wherein the generating of the virtual list further comprises:
    retrieving, by the order matching engine, an away market best bid or offer book that is stored physically separate from the market maker quote book and the order book and includes bids, offers, or a combination thereof, and arranging, by the order matching engine, the bids, offers, or a combination thereof of the away market best bid or offer book into the virtual list according to the predetermined criteria.

5. The method of claim 4, wherein the market maker quote is marketable if it touches the prices of the one or more of the contra-side market maker quote, the contra-side market center order, or the contra-side away market center quote.

6. The method of claim 4, wherein the market maker quote is marketable if it locks or crosses the one or more of the contra-side market maker quote, the contra-side market center order, or the contra-side away market center quote.

7. The method of claim 4, wherein the market maker quote book, the order book, and the away market best bid or offer book list one or more options series.

8. The method of claim 1, wherein said order matching engine is activated and executes its processing steps only upon receiving the alert message from the market maker quote engine.

9. The method of claim 4, the method further comprising, prior to the matching of the market maker quote:
reviewing, by the order matching engine, the quotes, orders, bids, offers, or combination thereof in the virtual list to determine whether the market maker quote is executable against one or more of a contra-side order or a contra-side quote; and
responsive to determining that the market maker quote is executable, generating, by the order matching engine, a new order based on the market maker quote.

10. The method of claim 9, the method further comprising, responsive to determining that the market maker quote is executable:
determining, by the order matching engine, whether the market maker quote is executable against one or more of the contra-side quote; and
responsive to determining that the market maker quote is executable against the one or more of the contra-side quote, generating, by the order matching engine, one or more second new orders based on each of the one or more of the contra-side quote.

11. The method of claim 1, wherein each of the order data pipeline and the quote data pipeline is configurable according to a respective order traffic volume and a quote traffic volume.

12. The method of claim 1, wherein the predetermined criteria includes at least one of a price priority and a time priority.

13. A computing system with optimized throughput comprising:
at least one memory storing code and at least one processor executing said code, execution of said code by the at least one processor causing the computing system to:
generate at least one order routine specifically configured to process orders,
generate an order book in the at least one memory that includes orders but no quotes,
generate a market maker quote book in the at least one memory that stores one or more quotes but no orders, wherein the market maker quote book and the order book are stored in physically separated data structures;
generate a market maker quote engine specifically configured to process quotes;
generate an order matching engine;
generate an order data pipeline specifically configured to receive orders from one or more order sources,
generate a quote data pipeline specifically configured to receive quotes from pre-validated quote sources, the quote data pipeline being separate from the order data pipeline;
said at least one processor interacting with the order data pipeline, the quote data pipeline, the at least one order routine, the market maker quote engine and the order matching engine such that:
the quote data pipeline receives an incoming market maker quote and transfers the market maker quote to the market maker quote engine,
the order data pipeline receives orders from the one or more order sources and transfers said orders to the at least one order routine,
the at least one order routine, when executed stores each received order in the order book, and
the market maker quote engine, when executed:
stores the received market maker quote in the market maker quote book having the one or more other quotes,
determines whether the market maker quote is marketable against one or more of a contra-side market maker quote in the market maker quote book, or a contra-side market center order in the order book,
responsive to determining that the market maker quote is marketable, generates an alert message and transmits the alert message to the order matching engine,
wherein the alert message executes the order matching engine, and the order matching engine, when executed:
generates a virtual list separate from the market maker quote book and the order book, by: taking a temporary snapshot of quotes in the market maker quote book without freezing the market maker quote book and retrieving orders from the order book such that the market maker quote engine continues to process additional quotes, and arranging the snapshot quotes and the retrieved orders into the virtual list according to predetermined criteria,
matches the market maker quote against one among the snapshot quotes and the retrieved orders in the virtual list, to generate a matched trade,
compares the market maker quote in the virtual list to a corresponding quote in the market maker quote book to determine whether a price of the market maker quote has changed; and
executes the matched trade when the price of the market maker quote has not changed.

14. The computing system of claim 13, wherein the computing system comprises one or more programmed computers.

15. The computing system of claim 13, wherein the computing system is distributed over several physical locations.

16. The computing system of claim 13, wherein the computing system is further configured to:
generate an away market best bid or offer book that is stored physically separate from the market maker quote book and the order book and includes bids, offers, or a combination thereof, and
arrange, by the order matching engine, the bids, offers, or combination thereof of the away market best bid or offer book into the virtual list according to the predetermined criteria.

17. The computing system of claim 16, wherein the market maker quote is marketable if it touches the prices of the one or more of the contra-side market maker quote, the resting contra-side market center order, or the contra-side away market center quote.

18. The computing system of claim 16, wherein the market maker quote is marketable if it locks or crosses the one or more of the contra-side market maker quote, the resting contra-side market center order, or the contra-side away market center quote.

19. The computing system of claim 16, wherein the market maker quote book, the order book, and the away market best bid or offer book list one or more options series.

20. The computing system of claim 13, wherein the order matching engine executes its process functions only when activated by the alert message received from the market maker quote engine.

21. The computing system of claim 16, wherein the order matching engine is further configured to, prior to matching the market maker quote:
   review the quotes, orders, bids, offers, or combination thereof in the virtual list to determine whether the market maker quote is executable against one or more of a contra-side order or a contra-side quote, and
   responsive to determining that the market maker quote is executable, generate a new order based on the market maker quote.

22. The computing system of claim 21, wherein the order matching engine, responsive to determining that the market maker quote is executable, is further configured to:
   determine whether the market maker quote is executable against one or more of the contra-side quote; and
   responsive to determining that the market maker quote is executable against the one or more of the contra-side quote, generate one or more second new orders based on each of the one or more of the contra-side quote.

23. The computing system of claim 13, wherein each of the order data pipeline and the quote data pipeline is configurable according to a respective order traffic volume and a quote traffic volume.

24. The computing system of claim 13, wherein the predetermined criteria includes at least one of a price priority and a time priority.

* * * * *